Patented Apr. 7, 1925.

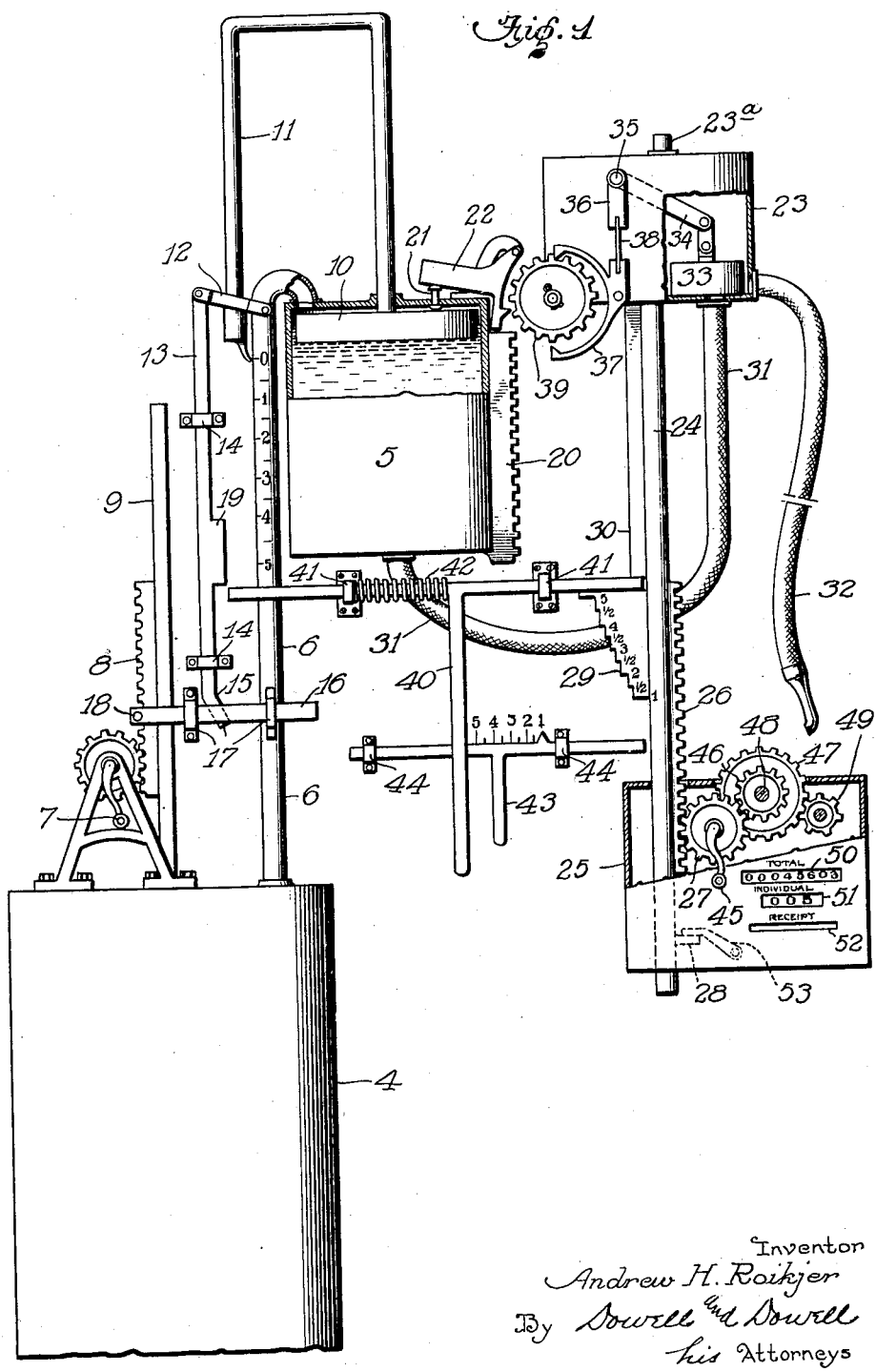

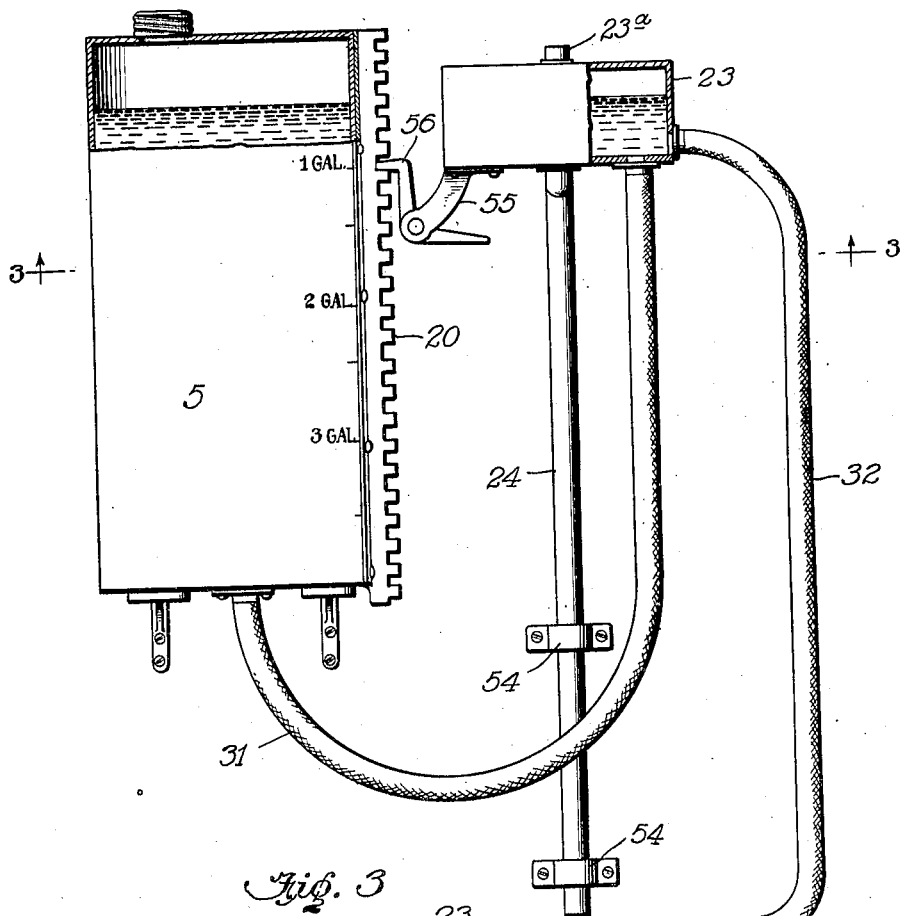
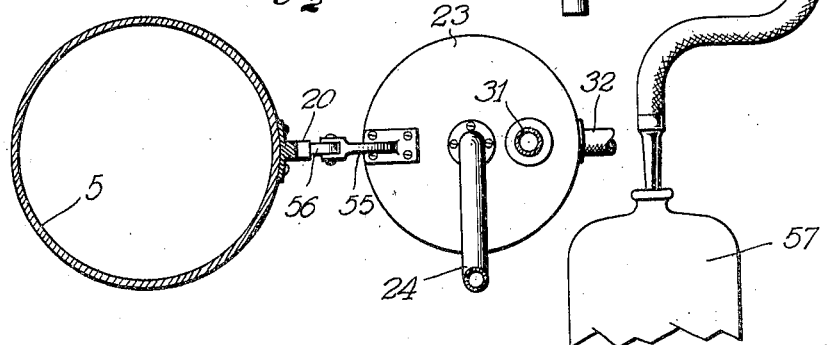

1,532,779

UNITED STATES PATENT OFFICE.

ANDREW H. ROIKJER, OF LOS ANGELES, CALIFORNIA.

LIQUID MEASURING AND DISPENSING DEVICE.

Application filed December 19, 1923. Serial No. 681,608.

*To all whom it may concern:*

Be it known that I, ANDREW H. ROIKJER, a citizen of the United States, residing at Los Angeles, in the county of Los Angeles and State of California, have invented certain new and useful Improvements in Liquid Measuring and Dispensing Devices; and I do hereby declare the following to be a full, clear, and exact description of the invention, such as will enable others skilled in the art to which it appertains to make and use the same.

This invention relates to liquid dispensing devices and more particularly to a standard measuring and dispensing device for gasolene or other liquid fuel.

The object of the invention is to provide a device for accurately measuring and delivering the desired quantity of liquid fuel, in association with a simultaneous computing mechanism for stamping and issuing a purchase ticket or receipt showing the exact quantity of fuel delivered and the total amount of the purchase at a predetermined price per gallon.

Another object is to provide a pumping and dispensing device which will be inoperative until a predetermined accurately measured quantity of fuel has been pumped into a temporary or delivery reservoir, and which will not leak nor permit variations in the measurable quantities of fuel delivered thereto.

A further object is to provide a device of the character referred to, which cannot be tampered with in such manner as to cause either a short-measure or long-measure.

A still further object is to provide a liquid-measuring and dispensing device which may, if desired, be successfully employed in connection with the ordinary pump so generally used in dispensing gasolene and other fuels.

The invention will first be hereinafter more particularly described with reference to the accompanying drawings, which are to be taken as a part of this specification and then pointed out in the claims at the end of the description.

In said drawings, Fig. 1 is a substantially diagrammatic elevation of my improved liquid-measuring and dispensing device, partly in section and partly broken away;

Fig. 2 is an elevation of a modified form of my device, illustrating its adaptability to more general use, parts being broken away; and Fig. 3 is a fragmentary view taken on the line 3—3 of Fig. 2.

Referring to the drawings in which like reference numerals are used to designate corresponding parts throughout the several views and to Fig. 1 particularly, 4 denotes an ordinary "housed" liquid pump in connection with a submerged storage tank (not shown) from which gasolene or other fuel is sucked or pumped into a superposed reservoir 5, through a passage pipe 6 by means of a crank 7, the latter being secured to one end of a stub-shaft carrying a gear or pinion in engagement with a rack portion 8 provided on a rod 9 which is vertically reciprocable within the housing 4 in a well known manner.

The reservoir 5 is adapted to contain an accurately measured quantity of liquid (as for instance, five gallons as shown in Fig. 1) in addition to a freely movable float 10 which rises and falls with the liquid level. Said float carries a light inverted U-shaped member 11, one arm of which is extended through the top of the reservoir and steadies or guides the float as it rises and falls within the container, while its other depending arm carries an extremetal pointer or indicator extended toward the passage pipe 6, upon which graduation marks at proper intervals are made to indicate the quantity of liquid discharged from the reservoir. As shown in Fig. 1, the indicator will point to zero when the reservoir is filled to capacity, and to the fifth or last mark when said reservoir is emptied.

The depending free arm of the member 11 is shouldered and extends through a link or goose-neck 12 with its shoulder underlying said link, one end of the link being pivoted on the pipe 6, its other end being swiveled to the upper end of a sliding rod or bar 13, the latter being vertically movable within guide brackets or blocks 14 secured to a post or rigid part of the housing or hood of the pump. Said sliding rod or bar 13 is bent or provided at its lower end with a terminal portion 15 at an angle obtuse to the axis thereof, said portion extending through the bifurcated portions of a sliding member or bolt 16, the latter being supported between brackets or blocks 17 as shown.

A cross-pin 18 is carried in the ends of the bolt 16, and the latter is caused to move back and forth by the bent end of bar 13 when said bar is moved up or down, thus bringing the cross-pin 18 into and out of engagement with the rack 8 to lock or unlock the pump rod 9 against movement.

The bar 13 is drawn upwardly by the shouldered depending arm of the member 11 engaging and lifting the link 12 when said member is raised by the float 10 sufficiently for its shouldered extremity to engage the under side of the link and said bar drops to normal position when the link is released by the arm of the member 11. Intermediate its ends, the bar 13 is provided with a shouldered extension or abutment 19 for a purpose to be hereinafter described.

A stationary rack 20 is secured to the exterior of the reservoir 5 and a double-headed inwardly depending stud or pin 21 is reciprocally extended through its top, said pin being engaged and pushed outwardly by the float 10 when the latter (carrying the member 11) is lifted to the top of the reservoir by the liquid supplied thereto.

The weighted free arm of a tri-armed rocking lever or pawl member 22, overlies the outwardly extended head of the pin 21, said member being fulcrumed or pivoted upon a suitable supporting bracket, with its dog or pawl normally projecting slightly beyond the rack 20, its weighted arm being rocked or tilted to withdraw or retract the extended pawl, when the float 10 pushes the pin 21 outwardly against the free arm of said member.

A relay receptacle 23, which is rigidly supported upon one end of a vertically reciprocable bar or rod 24, with its bottom normally elevated slightly above the level of the liquid in reservoir 5, is arranged adjacent said reservoir and adapted to move up and down with said rod, the opposite end of the latter being guidingly extended through a computing box or housing 25 and provided with a rack bar or portion 26 in engagement with an actuating gear or pinion 27 within said box, a small pin or "tripping" shoulder 28 being also provided near the lower extremity of said rod for a purpose to be hereinafter mentioned.

The reciprocable rod 24 is further provided with an angularly detented plate or extension 29 and a co-axial longitudinal flange or sliding abutment 30, with a narrow space or gap therebetween (as shown), the plate 29 being substantially triangular in shape, and formed with detents or notches in its extended margin which correspond in number to the liquid measured or measurable units of capacity in the reservoir 5 (which in the form shown for purposes of illustration, would be five, corresponding in number with a reservoir having a five-gallon capacity).

The ends of a flexible pipe or hose 31 are suspended respectively from the bottoms of reservoir 5 and the receptacle 23, through which the liquid may flow from the former into the latter, and a flexible hose 32 carrying an ordinary filler nozzle on its free end, is provided in the base of said receptacle for discharging the desired quantity of fuel into the storage tank of an automobile or other receptacle.

A float valve 33, is provided in the receptacle 23 overlying the liquid admission port in the bottom thereof, said valve being pivotally suspended from one end of a swinging lever 34 by means of a link connection therewith, the other end of said lever being secured to a rocking pin or rod 35 the ends of which are journally supported in the walls of the receptacle 23 with one end outwardly extended to receive an oscillating link 36 which is keyed or otherwise secured thereto.

A vent or pressure release valve 23$^a$ is provided in the top of the receptacle 23 to relieve any vapor pressure which might occur in said receptacle during the passage of the liquid fuel therethrough.

A yoke or escapement 37 is pivotally secured to the bottom of the receptacle 23 immediately subjacent the rod 35, and a flexible connection or leaf-spring 38 is provided between the body-portion of the escapement and the link 36. Said yoke or escapement 37, straddles an idling cog-wheel or gear 39 which is revolvably carried by the receptacle 23 and adapted to engage with the rack 20 in a well known manner.

A T-shaped shifting bar 40 having a horizontal reach slightly less than the measured distance between the bars 13 and 24, is supported subjacent the reservoir 5 between brackets or blocks 41 with its horizontal axis in line with the space or gap between the plate 29 and the flange 30 on the bar 24, and an expansible spring 42 is provided thereon for normally holding one end of the bar within the space between the parts referred to. It will be noted that the receptacle 23 cannot descend by gravity or other force carried thereupon, so long as the bar 40 remains in the position shown in Fig. 1, since the flange 30 on the bar 24 rests upon the end of the bar 40 and thus prevents reciprocal movement of the former.

A second T-shaped horizontal shifting bar 43 carrying a pointer or indicator and supported between brackets or blocks 44 is provided a predetermined distance below the plate 29 with one end extended therebelow toward the bar 24. A scale having spaced graduated marks at intervals equal to the depth of the detents or notches in the plate 29, is located above the bar 43 so that the indicator thereon will move over the scale as the bar is shifted from side to side. By placing said bar with its indicator at any mark on the scale, its extended end will thus be shifted to underlie the correspondingly numbered detent or notch on the plate 29 so that the latter will strike thereagainst at such point and arrest the downward movement of the bar 24 when the latter is released by the bar 40 and descends with the receptacle 23.

The gear or pinion 27 which engages the rack 26 on the bar 24, as above mentioned, is keyed or otherwise secured to a horizontal shaft supported in the walls of the computing-box 25, one end of said shaft being outwardly extended to receive a hand-crank 45 by which the shaft and gear may be rotated to elevate the bar and receptacle 23, to normal position.

A series or train of reduction gears are arranged within the computing-box 25, said series including a gear 46 in mesh with the gear 27, by which a larger gear 47 is caused to rotate through a common shaft 48, the latter being journaled in the walls of the box 25. The gear 47 meshes with a reduced gear 49 which is operatively driven thereby in a counter-clockwise direction (as the bar 24 descends) and is adapted to ratchet upon its shaft when rotated in the opposite direction.

The gear 47 meshes with a reduced gear 49 by which the computing mechanism is operated to cause registration of total and individual sales, said latter gear being operatively rotatable or driven with its shaft in a counter-clockwise direction (as the bar 24 descends) but adapted to idle or ratchet over its shaft without affecting the registering mechanism, when rotated in a clock-wise direction (as the bar 24 is moved to elevated position). Dial slots or windows 50 and 51 are provided in the side of the computing-box to display the registering figures representing total and individual sales or unit dispensations respectively, and a slot or opening 52 is also provided in the side of the box, through which an imprinted or stamped ticket or receipt may issue to the purchaser after the desired quantity of fuel has been delivered.

For such purpose, a pivoted trip-lever 53 is provided inside the box 25, adapted to be engaged and tripped by the shoulder 28 on the bar 24 when the latter (after descending to deliver the desired quantities of fuel) is again elevated to normal position, said tripped lever causing a ticket to be punched and ejected from the box through the slot 52 above mentioned.

It will be understood that gears of different sizes may be substituted for the gear 47, it being necessary merely to compensate for the increased or decreased diameter of the same by changing the relative position of the shaft 48 with the gears 27 and 49 in a well known manner. Thus, a gear of greater or less diameter may be interposed in the train to compensate and accommodate the computing mechanism in its registrations of fuel delivery and purchase value at a reduced or increased price per unit of measure.

The operation of the preferred embodiment of my invention, is as follows:

Liquid fuel is pumped from the submerged tank (not shown) through the pipe 6 into reservoir 5 by means of the crank 7. As the liquid level rises in said reservoir, the float 10 (carrying the member 11) is buoyantly lifted toward the top of the container until the latter is filled or supplied with a predetermined, accurately measured quantity of liquid, at which point the float 10 engages and pushes the pin 21 outwardly against the pawl member 22 to tilt or retract the latter from the cog-wheel 39, while simultaneously, the depending shouldered free arm of the member 11 engages and lifts the link 12, thereby raising the bar 13 with its shoulder 19 above the level of the horizontal bar 40, and causing the sliding bolt 16 to be drawn inwardly with its cross-pin 18 lodged within a recess of the rack-bar 8 to interrupt further movement of the pump-rod 9 and prevent operation of the crank 7 in either direction, thus effectually locking the parts.

The bar 43 is shifted across the associated scale with its indicator overlying or pointing to the numeral or mark thereon corresponding with the quantity of fuel desired by the purchaser, and the horizontal bar 40 is then shifted against the tension of its spring 42, to release the reciprocable bar 24 so that the latter (together with the receptacle 23) will descend a slight distance until the cog-wheel 39 rests against the upper edge of the rack 20, at which point the bottom of the receptacle 23 is brought to rest substantially on a level with the liquid in reservoir 5. At this instant, one end of the bar 40 is tensionally pressed against the edge of the flange or sliding abutment 30, (since the gap between said flange and the plate 29 has moved below the axis of said bar) while its other end underlies the shoulder 19 on the bar 13 to prevent the latter from dropping from its raised position.

The liquid in seeking its own level, will maintain a constant liquid column in the flexible connecting hose 31, and since the receptacle 23 has descended with the released reciprocable bar 24 until its bottom has momentarily come to rest slightly below the level of the liquid in reservoir 5, the liquid will now flow into said receptacle with a force sufficient to raise the valve 33. When said valve is thus raised, the suspension end of lever 34 will be elevated and rock the pin or rod 35 sufficiently to swing the link 36 away from cog-wheel 39 so that the spring 38 will react upon the escapement 37 and release its upper pawled arm from said cog-wheel, whereupon the latter will be free to engageably rotate over the rack 20 in a clockwise direction. The reciprocable bar and receptacle 23, being thus released, will continue to descend until the detented plate 29 engages and rests upon the end of the shifting bar 43 at the point for which said bar has been set, thereby preventing further descent of the receptacle. Meanwhile, the liquid will flow out of the receptacle 23 through delivery hose 32, until the liquid level in reservoir 5 has fallen to a point in equilibrium with the bottom of said receptacle, whereupon the valve 33 will reseat and relieve the tension upon the escapement 37 so that the latter will move to normal position to prevent further clockwise rotation of the cog-wheel.

As the bar 24 descends, the rack 26 will cause counter-clockwise rotation of the gear or pinion 27 by which the reduced gear 49 is actuated in a like direction through the associated train of gears to cause registration of the amount of fuel discharged and the purchase value of such quantity at a predetermined price per unit of measure.

I have not shown nor described the specific mechanism for accomplishing the purpose above described, since a computing-box of any ordinary design and construction may be adapted and used, and the computing-box per se forms no part of this invention except as an element in combination.

After the receptacle 23 has emptied, and its valve 33 has reseated, causing the escapement 37 to shift so as to permit cog-wheel 39 to rotate only in a counter-lockwise direction, the receptacle is again elevated to normal position by turning the crank 45. As above mentioned, the gear 49 merely ratchets over its shaft when rotated in a clockwise direction, so that the computing and registering mechanisms are not disturbed when the gear 27 is actuated against the rack 26 to hoist the receptacle in place.

When the receptacle has thus been elevated to normal position, the gap between plate 29 and flange 30 on the bar 24 is again moved in line with the horizontal bar 40, which immediately shifts to position therein under the tension of its spring 42, thus locking the bar 24 against descent until again released by withdrawal of the bar. Simultaneously, the opposite end of the bar 40 is disengaged from the shoulder 19 on the sliding bar 13 which immediately drops and causes the shifting bolt 16 to release the rack 8 so that the pump-rod 9 may be lowered to pumping position.

Also, since the float 10 no longer bears against the pin 21, the weighted free arm of pawl member 22 rests upon the top of the reservoir 5 with its pawl in engagement with the cog-wheel 39 which is thus prevented from rotating in either direction.

As the bar 24 is raised to elevated position (as shown in Fig. 1) the shoulder 28 thereon engages and trips the lever 53 which actuates the recording mechanism and causes a stamped ticket or receipt to issue through the slot 52.

Liquid fuel is again pumped into the reservoir 5, whereupon the respective parts will assume the position shown in the drawings, in which position the device is ready to deliver any desired quantity of fuel in the manner above described.

Referring now to Fig. 2 is which a modified and simplified form of my invention is shown for store and domestic use in accurately measuring and dispensing kerosene and other liquids, the pump computing-box, shifting bars, floats and their respective associated parts are omitted, the reciprocable bar 24 being supported in brackets or blocks 54, secured to a wall, post or the like.

A bracket 55 is dependingly secured to the bottom of the receptacle 23, and a manually operable dog or pawl 56 is pivotally secured thereto, said pawl being adapted to engage with the rack 20 and support the receptacle 23 at any height, with respect to reservoir 5, for which the pawl is set along said rack. A scale or graduation marks at predetermined proper intervals are placed on the rack 20 or the exterior of the container 5, to indicate the point at which the pawl should be engaged with the rack in order to discharge and deliver any desired measured quantity of fuel.

Thus, as shown in the drawings, if the pawl is set at the "1 gal" mark, the receptacle 23 is lowered and supported at a level at which one gallon will have issued from the container 5 when the liquid level in the communicating vessels reaches an equilibrium. The liquid will therefore flow into a receptive container 57 through discharge hose 32 until receptacle 23 is completely emptied and an accurately measured quantity of fuel in the desired amount is thus dispensed to a purchaser or user without waste or spilling over the floor, which often occurs when a measuring can is first filled and then emptied into the receptive container by hand.

It will be understood of course that various changes may be made in the construction and arrangement of parts without departing from the spirit and scope of my invention and I therefore do not desire to be limited by the appended claims, to the specific structure hereinbefore illustrated and described.

Having thus described my invention, what

I claim as new and desire to secure by Letters Patent of the United States is:

1. In a liquid measuring and dispensing device, the combination of a reservoir adapted to contain a measured quantity of liquid, a relatively small receptacle arranged adjacent said reservoir and adapted to move along a vertical axis, a reciprocable bar by which said receptacle is supported, means for arresting movement of the receptacle in either direction along its axis, flexible communicating means between said reservoir and said receptacle, and means for discharging liquid from the latter.

2. In a liquid measuring and dispensing device, the combination of a reservoir adapted to contain a measured quantity of liquid and means for supplying liquid thereto, a relatively small dispensing receptacle arranged adjacent said reservoir and adapted to movement along a vertical axis, a reciprocable sliding bar upon and with which said receptacle is movably supported, releasable means for arresting movement of the receptacle in either direction along its axis, flexible communication means for the liquid between said reservoir and said receptacle, and means for discharging liquid from the latter.

3. In a liquid measuring and dispensing device, the combination of a reservoir adapted to contain a measured quantity of liquid and means for supplying liquid thereto, a relatively small dispensing receptacle arranged adjacent said reservoir and adapted to move along a vertical axis to points above, below and intermediate the depth of said reservoir, a vertically slidable bar upon which said receptacle is rigidly supported, releasable means for arresting downward movement of the receptacle at any predetermined point along its vertical axis, flexible communicating means for the liquid between said reservoir and said receptacle by which equilibrium in the liquid level is established, and overflow means for discharging the liquid through and from the latter.

4. In a liquid measuring and dispensing device, the combination of a reservoir adapted to contain a measured quantity of liquid and means for supplying liquid thereto, a dispensing receptacle arranged adjacent said reservoir and adapted to movement along a vertical axis, a vertically reciprocable bar upon which said receptacle is supported, releasable means for holding said bar and receptacle in non-operable position and means for arresting downward movement of the receptacle at any predetermined point along its vertical axis whereby a measured quantity of liquid will be discharged therefrom, flexible communicating means between said reservoir and said receptacle through which equilibrium of liquid level is established therebetween, and outflow means for discharging the liquid through and from the latter.

5. In a liquid measuring and dispensing device, the combination of a reservoir adapted to contain a measured quantity of liquid and means for supplying liquid thereto, a dispensing receptacle arranged adjacent said reservoir and adapted to movement along a vertical axis, a vertically reciprocable bar upon which said receptacle is supported, releasable means for normally holding said bar and receptacle in non-operative position and adjustable means for arresting downward movement of the receptacle at any desired point along its vertical axis whereby a predetermined measured quantity of liquid may be discharged therefrom, flexible communicating passage means between said reservoir and said receptacle through which equilibrium of liquid level is established therebetween, and outflow means for discharging the liquid from said receptacle.

6. In a liquid measuring and dispensing device, the combination of a reservoir adapted to contain a measured quantity of liquid and means for supplying liquid thereto, a dispensing receptacle arranged adjacent said reservoir and adapted to movement along a vertical axis, a vertically reciprocable bar upon which said receptacle is supported, flexible communicating means between said reservoir and said receptacle through which equilibrium of liquid level is established therebetween and outflow means for discharging the liquid through and from the latter, liquid-controlled means for preventing downward movement of the receptacle until said reservoir is filled to a predetermined level, manually releasable means for normally holding said bar and receptacle in non-operative position and means when released for subsequently arresting downward movement of the latter at any predetermined measured point along its vertical axis whereby the desired quantity of liquid will be discharged therefrom.

7. In a liquid measuring and dispensing device, the combination of a reservoir adapted to contain a measured quantity of liquid and means for supplying liquid thereto, a dispensing receptacle arranged adjacent said reservoir and adapted to movement along a vertical axis, a vertically reciprocable bar upon which said receptacle is supported, flexible communicating means between said reservoir and said receptacle through which equilibrium of liquid level is established therebetween and outflow means for discharging the liquid through and from the latter, liquid-controlling means for preventing downward movement of the receptacle until said reservoir is filled to a predetermined level, manually releasable means for normally holding said bar and receptacle in non-operative position and means when released for subsequently arresting downward movement of the latter at any predetermined measured point along its vertical axis whereby the desired quantity of liquid will be discharged therefrom, and means for preventing a further supply of liquid to said reservoir until said discharge receptacle is returned to normal elevated position.

8. In a liquid measuring and dispensing device, the combination of a reservoir adapted to contain a measured quantity of liquid and means for supplying liquid thereto, a dispensing receptacle arranged adjacent said reservoir and adapted to movement along a vertical axis, a vertically reciprocable bar upon which said receptacle is supported, flexible liquid passage means between said reservoir and said receptacle through which equilibrium of liquid level is established therebetween, outflow means for draining and discharging a relative excess of the liquid through and from the latter, a releasable gravity and float actuated means for preventing downward movement of the receptacle until said reservoir is filled to a predetermined level, manually releasable means for normally holding said bar, with said receptacle in non-dispensing position and means after the latter are released for arresting their downward movement at a predetermined point along their traveling axes whereby the desired quantity of liquid will be discharged from the receptacle and means for preventing a further supply of liquid to said reservoir until said receptacle is returned to normal position.

9. In a liquid measuring and dispensing device, the combination of a reservoir adapted to contain a measured quantity of liquid and means for supplying liquid thereto, a dispensing receptacle arranged adjacent said reservoir and adapted to movement along a vertical axis, a vertically reciprocable bar upon which said receptacle is supported, a computing and recording box through which said bar is reciprocably extended to actuate the mechanism therein, flexible liquid passage means between said reservoir and said receptacle through which equilibrium of liquid level is established therebetween, outflow means for draining and discharging a relative excess of the liquid through and from the latter, releasable gravity and float actuated means for preventing downward movement of the receptacle until said reservoir is filled to a predetermined level, manually releasable means for normally holding said bar with said receptacle in non-dispensing position and means after the latter are released for arresting their downward movement at a predetermined measured point along their traveling axes whereby the desired quantity of liquid will be discharged from the receptacle and means for preventing a further supply of liquid to said reservoir until said receptacle is returned to normal position.

10. In a liquid measuring and dispensing device, the combination of a reservoir adapted to contain a measured quantity of liquid and means for supplying liquid thereto, a dispensing receptacle arranged adjacent said reservoir and adapted to movement along a vertical axis, a vertically reciprocable bar upon which said receptacle is supported, a computing and sales recording box through which said bar is reciprocably extended to actuate the mechanism therein, flexible liquid passage means between said reservoir and said receptacle through which equilibrium of liquid level is established therebetween, means for discharging a relative excess of the liquid through and from the latter, releasable gravity and float actuated means for preventing downward movement of the receptacle until said reservoir is filled to a predetermined level, manually releasable means for normally holding said bar and receptacle in non-dispensing position and means for arresting their downward movement at a predetermined point along their line of travel after the latter are released, whereby the desired quantity of liquid will be discharged from the receptacle, means for preventing a further supply of liquid to said reservoir until said receptacle is returned to normal position and means for preventing the receptacle from being restored to normal position until it is emptied.

11. An apparatus for measuring and dispensing liquids comprising a reservoir and means associated therewith whereby the liquid therein may be discharged therefrom at intervals in measured quantities, a vertically movable receptacle having a flexible-pipe-connection with said reservoir through which liquid is conducted into said receptacle when lowered below the level of the liquid in said reservoir, and means for lowering said receptacle step by step and securing it in position to receive and deliver a measured quantity of liquid at each descending movement, together with means for conducting the liquid entering said receptacle into a tank or other container.

In testimony whereof I affix my signature in the presence of two witnesses.

ANDREW H. ROIKJER.

Witnesses:
HENRY WESSEL,
JNO. H. COWNOVER.